UNITED STATES PATENT OFFICE 2,315,188

METHOD OF TREATING BASIC LEAD SULPHATE

William J. Clapson, Joplin, Mo., assignor to The Eagle-Picher Lead Company, Cincinnati, Ohio, a corporation of Ohio No Drawing. Application September 14, 1940, Serial No. 356,836

3 Claims. (Cl. 23—127)

My invention relates to the treatment of lead sulphate and has for its object the provision of a method for treating basic lead sulphate to impart certain desirable properties thereto whereby I am enabled to change its physical characteristics and increase the viscosity of paints containing the treated basic lead sulphate as an ingredient. In the production of basis lead sulphate by the subliming process either molten lead is atomized into an atmosphere containing a high concentration of sulphur dioxide gas or lead sulphide of a high degree of purity is ignited in an oxidizing atmosphere and converted to basic lead sulphate. In either case the composition of the product is represented, approximately, by the formula $2PbSO_4.PbO$, which may be written $3PbO.2SO_3$ although the composition may be varied as desired.

When this pigment is ground in linseed oil the resulting paint has a low viscosity when compared with the viscosity of paint similarly made from basic lead sulphate produced by the wet process and which corresponds approximately to the formula $3PbO.2SO_3.H_2O$. I believe that this difference in viscosity may be due, at least in part, to the presence of combined water in the basic lead sulphate molecule.

In carrying out experiments to increase the viscosity of paints containing basic lead sulphate produced by the subliming method I have made the new and novel discovery that by subjecting basic lead sulphate to treatment with steam I am able to alter the physical and chemical qualities of the product to such an extent that when used as a pigment in admixture with linseed oil the resulting product has a viscosity greater than if it were made with untreated basic lead sulphate. In practice I may select a basic lead sulphate containing from 15 to 30 per cent of non-sulphated PbO. I subject this to steam at approximately 300° F. at a pressure of approximately 53 pounds per sq. in. for about two hours, although the invention is by no means restricted to these conditions of time and temperature. For example, although I have found that steam at temperatures from 224° F., 4 lbs. pressure, to 332° F., 92 lbs. pressure, may be used and that increasing the steaming time to six hours from two hours is not harmful, I prefer a steaming period of two hours at 300° F., 52 lbs. pressure. A result of the steaming concomitant with increase in viscosity may be an increase in weight, usually less than 1%, the amount depending on conditions of treatment, such as the temperature of treatment, temperature of the pigment introduced into the treating chamber, duration of the treatment, size of the sample, nature of the container, etc. Cases have been found where the increase in weight was less than 0.1% and an increase in viscosity of the paint resulted, but usually the increase in weight is between 0.1% and 1%.

To illustrate the treatment given and the results obtained I cite two examples:

Example I

An autoclave, a large porcelain evaporating dish, 8½ inches in diameter, and a glass cover for the dish were preheated for 2 min. with steam at 240° F., 900 grams of basic lead sulphate containing 21.7% non-sulphated PbO were quickly added to the tared dry dish, the glass plate laid over the dish, and the system placed in the autoclave. Steam was introduced rapidly raising the temperature to 230° F. in about ½ minute. After 1 minute at 230° F. the steam was blown off and again admitted rapidly till a temperature of 224° F., 4 lbs. pressure, was reached, where it was maintained for 2 hours. The steamed sample was quickly weighed in the tared container and now weighed 904.5 grams, an increase of 0.5%. It was blended by rolling on paper and stored 3 days in a sealed container before testing.

Paints were prepared from the steamed and from the blank pigments, using 800 grams pigment with 270 grams raw linseed oil. Viscosities measured on the Stormer viscosimeter compare as follows:

| Age of paint (days) | Pigment | Viscosity (seconds/100 revs. with wt. shown) | | |
|---|---|---|---|---|
| | | 250 g. | 500 g. | 1000 g. |
| 1 | Steamed 2 hrs. at 224° F. | ∞ | 44 | 11.0 |
| | Blank | ∞ | 37 | 10.2 |
| 2 | Steamed 2 hrs. at 224° F. | ∞ | 47 | 11.3 |
| | Blank | ∞ | 29 | 9.7 |
| 7 | Steamed 2 hrs. at 224° F. | ∞ | 34 | 11.5 |
| | Blank | 1200 | 26.4 | 9.4 |
| 21 | Steamed 2 hrs. at 224° F. | 700 | 27.6 | |
| | Blank | 300 | 22.1 | |

Example II 500 grams basic lead sulphate containing 21.7% non-sulphated PbO were weighed into each of two tin-plate pudding dishes, 5″ diameter at bottom, placed in an autoclave which had been preheated at 300° F. for 5 minutes, and covered with a sheet iron plate, also preheated. Steam was admitted, raising chamber temperature to 300° F., 52 lbs. pressure, in about ½ minute, held at 300° F. for 1 minute, exhausted and again admitted raising temperature to 300° F. in about 1 minute, where it was maintained for two hours. The samples were then removed, allowed to cool a few minutes and weighed while still warm. Net weights were 500.0 g., 501.5 g., respectively. The two batches were immediately blended and stored overnight in loosely covered containers.

Paints were prepared and tested as in Example I.

| Age of paint (days) | Pigment | Viscosity (seconds/100 revs. with wt. shown) | | |
|---|---|---|---|---|
| | | 250 g. | 500 g. | 1000 g. |
| 1 | Steamed 2 hrs. at 300° F. | ∞ | 79 | 12.1 |
| | Blank | 1125 | 34 | 10.3 |
| 2 | Steamed 2 hrs. at 300° F. | ∞ | 75 | 12.0 |
| | Blank | ∞ | 34 | 10.5 |
| 7 | Steamed 2 hrs. at 300° F. | ∞ | 57 | 12.0 |
| | Blank | ∞ | 27.5 | 9.4 |
| 22 | Steamed 2 hrs. at 300° F. | nearly ∞ | 32.1 | |
| | Blank | nearly ∞ | 23 | |

In utilizing basic lead sulphate in mixed paint formulations it is desirable to have selections of basic lead sulphates which give different viscosities in the resulting paints. My invention when used with regular basic lead sulphate to varying degrees gives products which allow the paint formulator a wider selection of basic lead sulphates than has heretofore been possible.

Having thus described my invention what I claim as new and desire to secure by Letters Patent is:

1. The herein described process of treating basic lead sulphate produced by the sublimation process which consists in selecting basic lead sulphate containing from 15 to 30 per cent of non-sulphated lead oxide and subjecting the basic lead sulphate to the action of steam at gauge pressure varying from approximately 4 pounds per square inch to approximately 92 pounds per square inch for approximately 2 hours.

2. The herein described process of treating basic lead sulphate produced by the subliming process which consists in selecting basic lead sulphate containing non-sulphated lead oxide and subjecting the basic lead sulphate to the action of steam under pressure for a period varying from approximately 2 hours to 6 hours at a temperature varying from approximately 224° F. to approximately 332° F.

3. The herein described process of treating fumed basic lead sulphate which comprises exposing the basic lead sulphate to the action of steam under gauge pressure varying from approximately 4 pounds per square inch to approximately 100 pounds per square inch whereby to increase the weight of the fumed basic lead sulphate from 0.1 per cent to 1 per cent.

WILLIAM J. CLAPSON.